3,270,764
PRESSURE CONTROL VALVE FOR USE WITH
MINE WINDERS
Colin McFadyen, Mufulira, Northern Rhodesia, and Bernard E. Shaw, Paisley, Scotland, assignors to Fullerton, Hodgart & Barclay Limited, Paisley, Scotland, a corporation of Great Britain and Northern Ireland
Filed Oct. 16, 1962, Ser. No. 230,956
5 Claims. (Cl. 137—116.3)

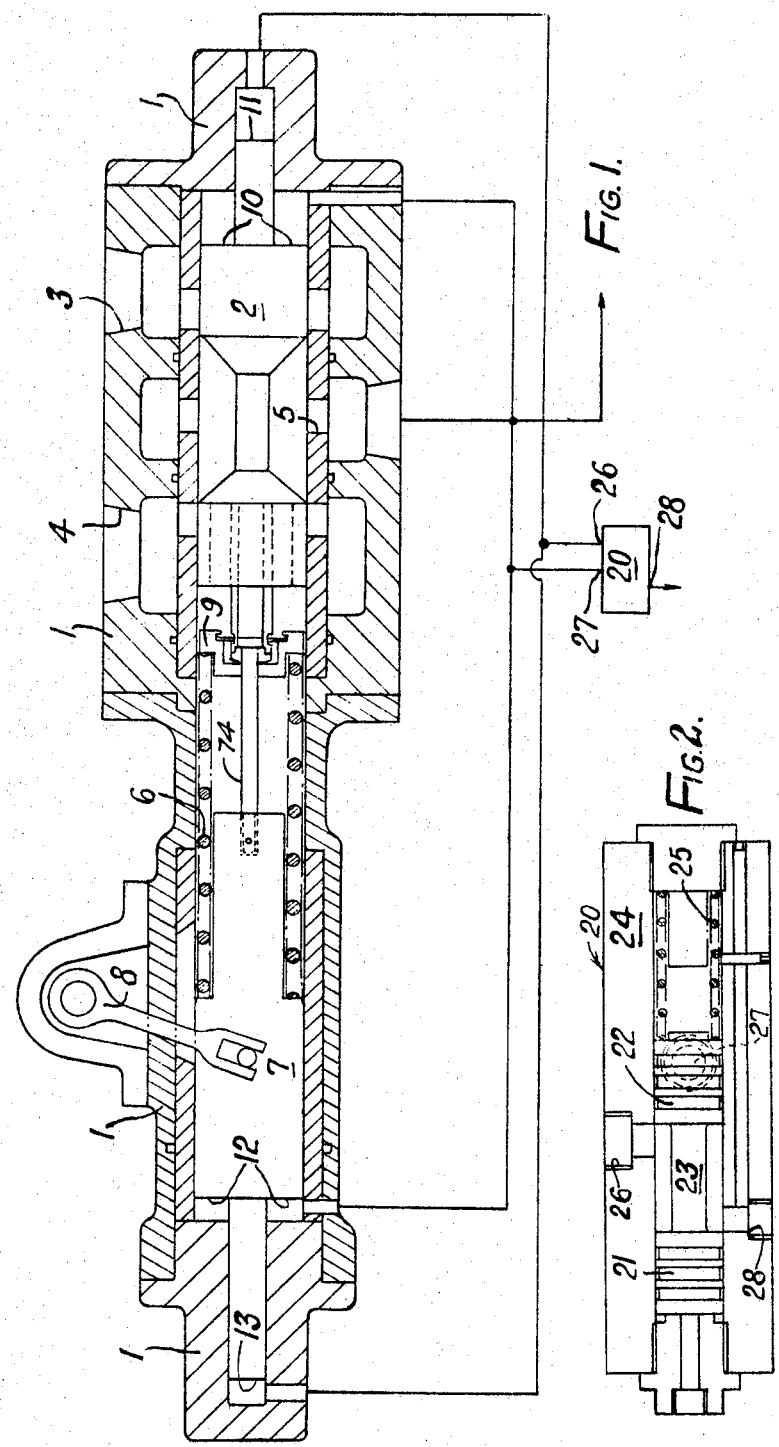

This invention is concerned with improvements in or relating to mine winders and, more particularly, to mine winders of the type having two winding drums rotatable on a common shaft, a first winding rope, wire or the like, hereinafter referred to for simplicity as the first winding rope, being wound on one of the drums in one direction while a second winding rope, wire or the like, hereinafter referred to for simplicity as the second winding rope, is wound on the second drum in the opposite direction. Attached to the free ends of the two winding ropes are containers, for example, cages, which it is desired to raise and lower in the associated mine shaft.

The position of one of the containers within the mine shaft can be altered without altering the position of the other container by permitting one of the drums to be disengaged from driven engagement with the common shaft which drives the drums. When the desired relative position of the two containers is attained the disengaged drum is re-connected to the shaft as to be driven thereby.

Each drum is provided with its own braking system and brake engine. Under normal conditions of operation i.e. when both drums are connected in driven engagement to the driving shaft, each braking system is required to supply half of the total braking torque required to balance the net out of balance torque on the drums.

When, however, one of the drums is disengaged from the driving shaft, by declutching the drum from the shaft, then the braking torque required on each drum is greater than under normal conditions of operation as defined above since the torques on the two drums are not partially balanced as is the case under normal conditions. The braking torque required on each drum is, at its maximum, greater than twice the braking torque applied to each drum under normal conditions of operation as defined above. This is due to the weight of the winding rope between the container associated with the engaged drum and said drum, and to the weight of the load in said container. The braking torque may be of the order of three times the torque required under the normal conditions.

Considering one of the drums, variation in the value of the braking torque required between the condition of normal operation and the condition in which only said drum is in driven engagement with the shaft is achieved by varying the pressure in the brake engine of the pressure medium which constitutes the working medium in said engine. The means by which the increased braking torque is applied to the drum which is not in driven engagement with the shaft does not constitute part of the present invention and, in consequence, is not described.

Control of the pressure of the working medium in the brake engine is achieved by means of a valve of the type known as an Iversen Valve. The relationship between the movement of the control gear and the variation in pressure in the associated brake engine is linear in a valve of this type.

With this type of valve it is essential that there be a relative displacement of the valve member and hence of the control gear, between the position at which the exhaust port is closed and the inlet port is opened so that a certain proportion of the total movement of the control gear does not affect the pressure of the working medium in the brake engine and is referred to as "dead movement." This "dead movement" constitutes a relatively small proportion of the total movement required to achieve the high pressure of the working medium and hence the large braking torque necessary when one of the drums is declutched from the driving shaft but it is a disadvantage that under normal conditions of operation, again as previously defined, this proportion is relatively large.

It is the primary object of this invention to provide a valve in which two scales of brake engine pressure to control gear movement can be obtained automatically and without the necessity to change the spring or any other part of the valve thereby ensuring that the proportion of the total movement of the control gear which is "dead" movement is small irrespective of whether one drum is declutched from the driving shaft or whether both drums are in driven engagement with said shaft.

A valve according to this invention comprises a casing, a valve member axially movable within the casing as to permit a pressure medium to flow therethrough from a source of said pressure medium to a brake engine associated with a drum of a mine winder, and a compression spring acting on the valve member and on an axially movable actuating member as to urge said members apart, the actuating member being movable towards the valve member by lever means connected thereto, the faces of the valve member and of the actuating member remote from the compression spring being stepped and the pressure in the brake engine being caused to act on the total area of said faces or on a portion thereof depending on whether both drums of the mine winder are in engagement with the driving shaft or only said drum is in engagement therewith, respectively.

In the accompanying drawings:
FIG. 1 is a sectional view of one embodiment of a valve according to the invention.
FIG. 2 is a sectional view of the changeover valve shown in FIG. 1.

Referring to FIGS. 1 and 2 inclusive of the drawings like numerals denote like parts, 1 denoting each of a plurality of parts which constitute the valve casing. A valve member 2 is axially movable to cover and uncover an inlet port 3 for the pressure medium, and port 4 which allows the pressure medium to be exhausted from the brake engine (not shown) by way of the valve. A port 5 provides communication between the valve and the brake engine.

Referring to FIG. 1, a compression spring 6 is located between an axially slidable actuating member 7, which is directly connected to lever means 8 for actuation thereby, and a collar 9 which is slidably mounted on a rod 74, one end portion of which is pin-connected to the member 7 and the other end portion of which is slidably mounted within a bore formed in the adjacent end face of the valve member 2. The collar 9 is maintained, under the influence of the spring 6, in engagement with the valve member 2 so that on movement of the collar 9 the valve member 2 is axially moved. The end portion of the valve member 2 remote from the collar 9 is of stepped construction having an annular and a core face, 10 and 11 respectively, while the end portion of the actuating member 7 remote from the compression spring 6 is also of stepped construction having an annular and a core face, 12 and 13 respectively.

Referring to the embodiment illustrated in FIGS. 1 and 2, only the annular faces 10 and 12 (FIG. 1) are in communication with the pressure in the brake engine when the associated drum is in driven engagement with the driving shaft and the other drum is disengaged therefrom. Under normal conditions of operation, however, when both drums are in engagement with the driving shaft, the pressure in the brake engine is in communication with the annular faces 10 and 12 and with the core faces 11 and 13 (FIG. 1).

Means controlling whether the pressure in the brake engine acts on the combined area of the annular faces 10 and 12 and the core faces 11 and 13 (FIG. 1) comprises a changeover valve, denoted generally by the numeral 20, which is operatively connected to the clutch, operation of which controls engagement and disengagement of the other drum and the driving shaft, so that when the other drum is disengaged from the driving shaft the changeover valve 20 is actuated to cause the pressure in the brake engine to act only on annular faces 10 and 12 (FIG. 1) while when both drums are engaged with the driving shaft the changeover valve 20 causes the pressure to act on both the annular faces 10 and 12 and the core faces 11 and 13 (FIG. 1).

It should be noted that while the invention has been illustrated and described with reference to the annular faces 10 and 12 (FIG. 1) being in communication with the pressure in the brake engine when only the associated drum is in engagement with the driving shaft it may instead be the core faces 11 and 13 (FIG. 1) which are in communication with said pressure in this condition of operation.

Referring to FIG. 2 the changeover valve 20 comprises two pistons 21, 22 axially movable on a common piston rod 23 within a casing 24. A pressure medium, the supply of which is controlled by movement of the clutch associated with said other drum acts on the end face of the piston 21 remote from the piston rod 23. A compression spring 25 acts on the end face of the piston 22 remote from the piston rod 23. A port 26 is so located in the casing 24 that irrespective of whether the pistons 21, 22 and the associated piston rod 23 are in the first position i.e. the position corresponding to normal operation of the mine winder (to the right of the position illustrated in FIG. 2) or the second position (FIG. 2) i.e. the position in which the other drum is disengaged from the driving shaft, the port 26 is positioned between the pistons 21, 22. The port 26 is in communication with the core faces 11 and 13 (FIG. 1). Second and third ports 27, 28 respectively are located in the casing 24 so that with the pistons 21, 22 in the first position the second port 27 is positioned between the two pistons 21, 22 and the third port 28 is covered by the piston 21, while with the pistons 21, 22 in the second position the third port 28 is in communication with the interior of the casing 24 between the two pistons 21, 22 and the port 27 is covered by the piston 22.

The second port 27 is in communication with the pressure medium in the brake engine, or with a point in the brake engine circuit where the pressure is the same as that in the brake engine, while the third port 28 serves as a drain for pressure medium from the interior of the casing 24. The spring serves to return the pistons 21, 22 to the second position after they have been actuated by pressure medium, the supply of which is controlled by the clutch associated with the other drum, to cause them to move to the right as viewed in FIG. 2 from the second to the first position.

Considering the control valve in the condition as illustrated in FIG. 1, the admission of pressure fluid into the interior of casing 1 through inlet port 3 is prevented by the blocking of port 3 by the right-hand portion of valve member 2.

Movement of lever means 8 in a counter clockwise direction causes the member 7 to move to the right. Since the member 7 is connected to the valve member 2 through spring 6 and collar 9, the valve member 2 also moves to the right, thus uncovering inlet port 3 and permitting pressure fluid to flow through the port 3 into the casing 1 between the left-hand and right-hand portions of the valve member 2. The pressure fluid flows through the port 5 to the brake engine and to the annular faces 10 and 12 on which the pressure fluid acts. The pressure thus acting on the annular faces 10, 12 causes the member 7 and the valve member 2 to be urged together with resultant compression of the spring 6. This urging together is accomplished by the valve member 2 moving to the left with respect to the member 7, since movement of the member 7 due to the pressure medium is prevented by the influence on the member 7 of the lever 8. Therefore, valve member 2 moves to the left until the right-hand end portion of the member 2 covers the inlet port 3, thereby shutting off the supply of pressure medium to the brake engine. In this position, a condition of pressure equilibrium is established in the system, the pressure of the fluid supplied to the brake engine being at a particular valve.

The preceding assumes that the changeover valve 20 remains in such a position as to prevent the flow of the pressure medium to the core faces 11 and 13. Considering the instance in which the pressure medium is supplied to the core faces as well as the annular faces 10, 12 and the lever 8 is in the same position illustrated in FIG. 1, the movement of lever means 8 toward the right with the resultant opening of port 3 will cause a greater area of the stepped end of valve member 2 to be contacted by the pressure fluid, since the combined areas of faces 10 and 11 is greater than the area of 10 alone. Therefore, less pressure is required to reach the state of equilibrium by moving valve member 2 toward member 7 than was required when the pressure medium acted on faces 10 and 12 alone. Thus, the equilibrium pressure is less. From the above, it is clearly seen that two scales of response are obtainable, depending on whether the pressure fluid acts on only the annular faces 10 and 12 or is allowed to also act on core faces 11 and 13.

Movement of the lever means 8 in a clockwise direction from its extent of travel in the counter clockwise direction causes movement of the member 7 to the left. The valve member 2 also moves to the left through the same distance as does the member 7 until the left-hand portion of the member 2 uncovers outlet port 4. The pressure fluid is then exhausted through port 5 from the brake engine and from the chambers comprising the faces 10, 11, 12, 13. As the pressure fluid is exhausted, the forces which urged members 2 and 7 together are relieved so that the two members move apart under the influence of spring 6, this movement consisting of movement of the valve member to the right with respect to member 7, since the member 7 is restrained by the influence of lever means 8. When the lever means 8 has returned to its initial position, the member 7 and valve member 2 have also returned to their initial positions, ports 3 and 4 being covered.

It is seen that the movement of member 7 is at all times under the control of lever means 8. The action of the pressure fluid on the faces 12 and 13 eliminates the necessity of imparting a sufficiently high force to the lever means 8 to resist the pressure fluid force on the face 10 or the faces 10 and 11.

Although there is specifically described above a specific embodiment which the present invention may assume in practice, it would be understood that this form is shown merely for purposes of illustration, and that the same may be modified and embodied in various other forms without departing from the spirit and scope of the appended claims.

What is claimed is:

1. A control valve comprising a first casing, first port means formed in said first casing for the passage of a pressure medium through said casing, a first valve member axially movable within said casing to a position in which the flow of said pressure medium through said casing is permitted and to a position in which the flow is prevented, said valve member having one end face thereof of stepped construction, an actuating member axially movable within said casing, said actuating member having one end face thereof of stepped construction, means connecting the non-stepped end faces of said valve member and said actuating member in spaced relationship, said connecting means comprising resilient means urging said members apart and adapted to be compressed to allow said members to be moved together, force imparting means connected to said actuating member for axially moving said actuating member and said valve member within said casing, means selectively imparting said pressure medium to any number of the step faces of said stepped end faces of both of said members when said valve member is in a position permitting the flow of said pressure medium through said casing, the impinging of said pressure medium on said stepped end faces urging said members together by compressing said resilient means, said valve member thereby moving toward said actuating member to said position in which the flow of said pressure medium through said casing is prevented, the pressure necessary to move said valve member to the position in which the flow is prevented being dependent upon the number of step faces on which said pressure medium is permitted to act.

2. A control valve according to claim 1 wherein said valve member comprises first and second end portions slideable within said casing in substantially fluid tight relationship with the inside walls of said casing, said first end portion being connected to said connecting means and said second end portion having said stepped construction, and second connecting means interconnecting said first and second end portions in spaced relation.

3. A control valve according to claim 2 wherein said first port means comprises first, second and third ports, said first port being provided for the entry of said pressure medium into said casing and adapted to be closed by said second end portion of said valve member, said second port being always between said spaced first and second portions and remaining open, and said third port being provided for the exhausting of said pressure medium from said casing and adapted to be closed and opened by movement of said first end portion, said third port being closed when said first port is opened, whereby release of the compressed resilient means when said members have been urged together sufficiently to close said first port is achieved by moving said force imparting means until said third port is opened by said first end portion, thereby exhausting said pressure medium and releasing the compression on said resilient means.

4. A control valve according to claim 1 wherein said force imparting means comprises lever means for controlling the movement of said actuating member.

5. A control valve according to claim 1 wherein said means for selectively causing said pressure medium to act against said step faces comprises a changeover valve hydraulically connected to said first valve to selectively direct a portion of said pressure medium upon leaving said casing onto the step faces of said members, said changeover valve comprising a second casing, fourth, fifth and sixth ports formed in said second casing for the passage of said pressure medium therethrough, a second valve member axially movable within said second casing to a first position in which said fourth port is in communication with said fifth port and said sixth port is closed by the second valve member and to a second position in which said fourth port is in communication with said sixth port and said fifth port is closed by the second valve member, said fourth port being hydraulically in communication with at least one of said step faces of said stepped end faces of each of said first valve member and said actuating member, said fifth port being hydraulically in communication with those step faces not in communication with said fourth port, and said fifth port being in communication with said first port means for receiving the pressure medium passed through said first casing, and said sixth port being provided as an exhaust for said pressure medium from said second casing, biasing means acting to urge said second valve member to said second position, and means for moving said second valve member to said first position in opposition to said biasing means.

References Cited by the Examiner
UNITED STATES PATENTS

| | | | |
|---|---|---|---|
| 1,579,940 | 4/1926 | Iversen | 303—54 |
| 2,931,389 | 4/1960 | Moog et al. | 137—85 X |

M. CARY NELSON, *Primary Examiner.*

MARTIN P. SCHWADRON, *Examiner.*

E. REICHERT, *Assistant Examiner.*